No. 614,027. Patented Nov. 8, 1898.
G. W. ROSE.
GARDEN CULTIVATOR.
(Application filed Mar. 31, 1897.)
(No Model.) 2 Sheets—Sheet 1.
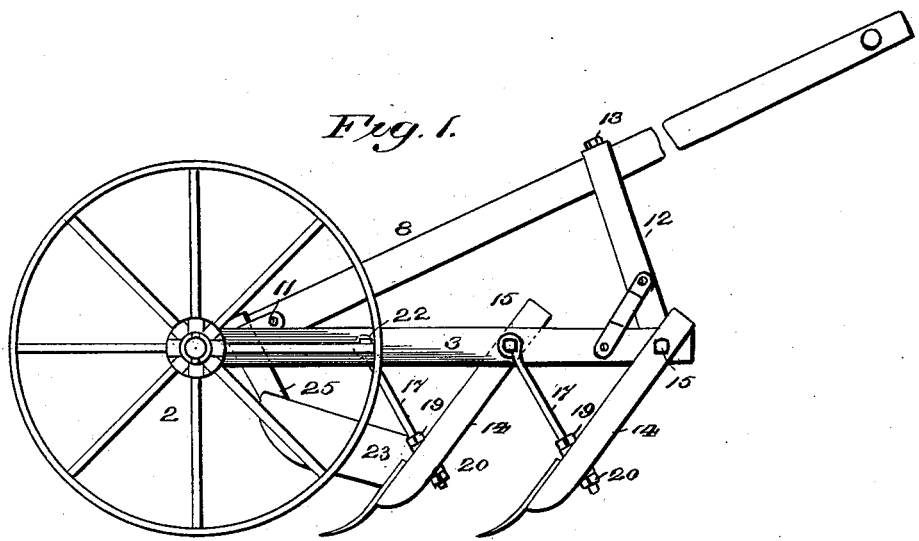
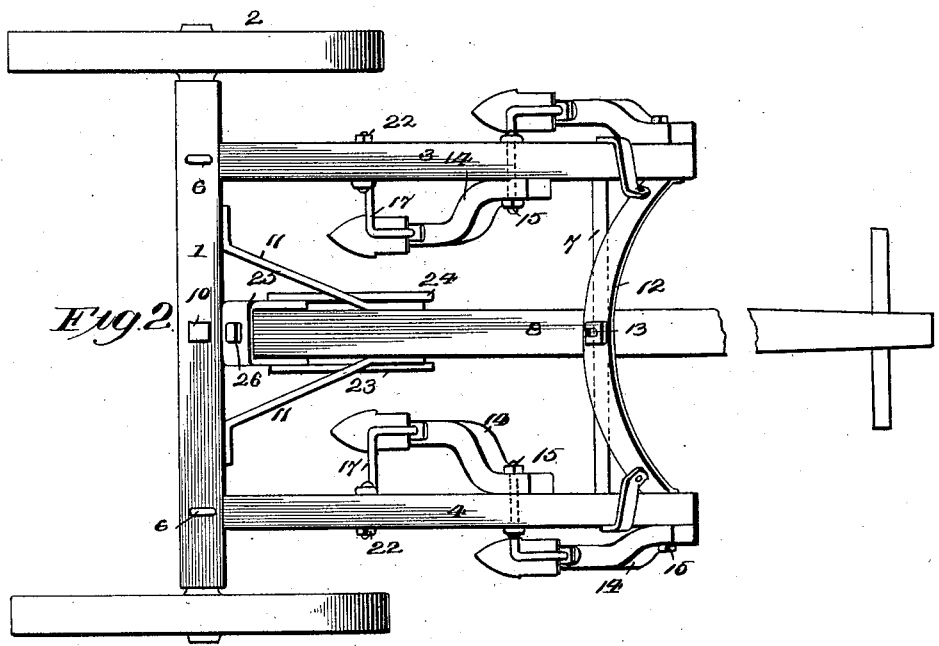
WITNESSES
Jos. C. Slack
A. M. Paynton
INVENTOR
George W. Rose
By John Shedherbern
Attorney No. 614,027. Patented Nov. 8, 1898.
G. W. ROSE.
GARDEN CULTIVATOR.
(Application filed Mar. 31, 1897.)
(No Model.) 2 Sheets—Sheet 2.
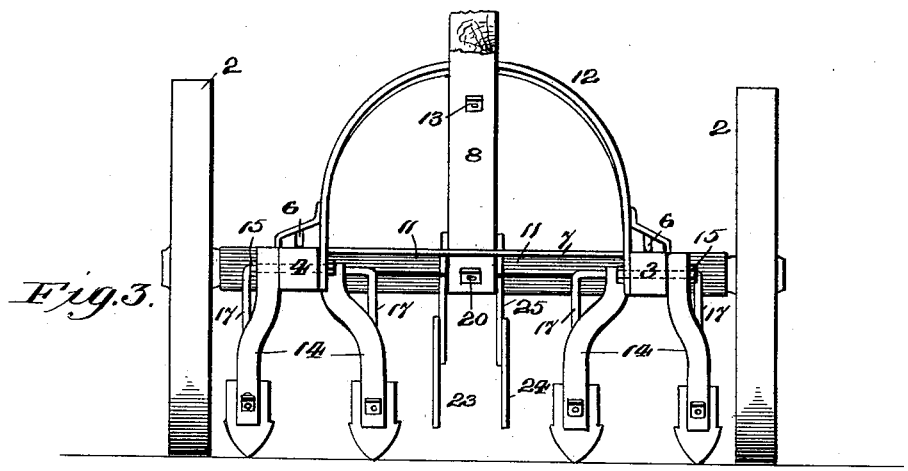
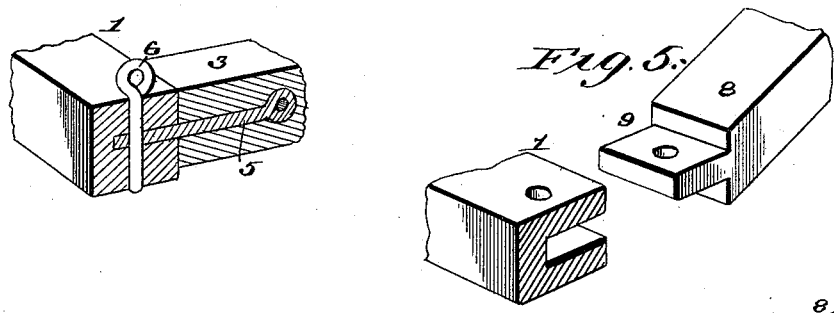
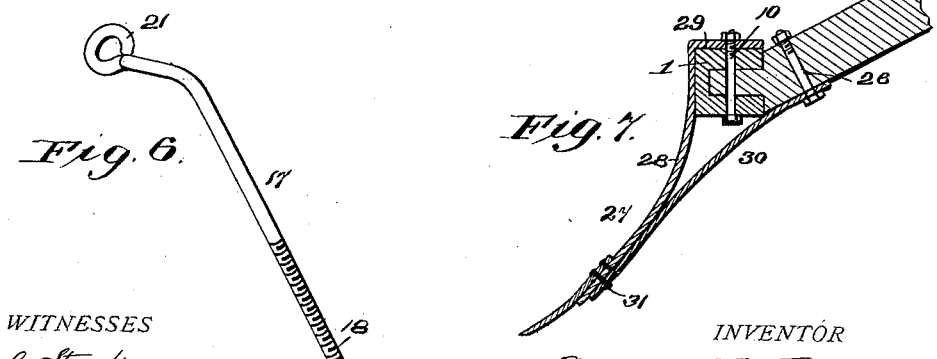
WITNESSES
Jos. C. Stack
Ann Paynton
INVENTOR
George W. Rose.
By John Heddleson
Attorney

UNITED STATES PATENT OFFICE.

GEORGE W. ROSE, OF NEW BEDFORD, ILLINOIS.

GARDEN-CULTIVATOR.

SPECIFICATION forming part of Letters Patent No. 614,027, dated November 8, 1898.

Application filed March 31, 1897. Serial No. 630,038. (No model.)

*To all whom it may concern:*

Be it known that I, GEORGE W. ROSE, a citizen of the United States, residing at New Bedford, in the county of Bureau and State of Illinois, have invented certain new and useful Improvements in Garden - Cultivators; and I do hereby declare the following to be a full, clear, and exact description of the invention, such as will enable others skilled in the art to which it appertains to make and use the same.

My invention relates to walking garden-cultivators of the straddle-row type, and is designed to be operated by hand by being pushed forward in front of the operator.

My objects are to provide a light machine of the class described which will be of extremely cheap and simple construction, which may be readily taken apart or assembled, and which will have improved adjusting devices for the shovels.

Having the foregoing objects in view, the invention consists of a garden - cultivator comprising certain improved features and combinations of parts appearing more fully hereinafter.

In the accompanying drawings, Figure 1 is a side elevation; Fig. 2, a plan view; Fig. 3, a rear elevation; Fig. 4, a detail view showing the connection between the frame and the axle; Fig. 5, a similar view showing the connection of the handle; Fig. 6, a detail view of one of the adjusting devices for the shovels; and Fig. 7, a similar view of a combined marker and shovel.

The numeral 1 designates the axle, which is mounted in traction-wheels 2.

At 3 and 4 are shown the side pieces of the frame, which have tongues 5, which fit into slots in the axle and are held in position by the removable pins 6. A suitable brace 7 connects the side pieces of the frame.

The numeral 8 designates an inclined handle which has a tongue 9, which is fitted in the slot in the axle and held in position by a bolt 10. Braces 11 connect this handle to the axle.

The numeral 12 designates a curved brace which is connected by a bolt 13 to the handle and is secured to the side pieces of the frame.

The shovel-standards are shown at 14, the same being connected to the side pieces of the frame by bolts 15. The shovels are shown at 16. The rear shovel-standards are located on the outside of the bars of the frame and curve outwardly, and the forward standards are located on the inside of said bars and curve inwardly. By reason of this arrangement a perfect cultivation is had. The braces for the standards are shown at 17, they being provided with screw-threaded portions 18, which pass through the standards and have nuts 19 and 20 located on opposite sides of the latter. The upper portions of the braces are bent laterally and provided with an eye 21. The eyes of the braces for the rear standards encircle the bolts of the front standards, and said braces are located outside the frame. The braces for the front standards are located inside the frame and are connected to independent bolts 22.

The numerals 23 and 24 designate fenders, and 25 is a U-shaped clip which connects them and straddles the handle, being connected to the latter by a bolt 26.

It will be seen that by loosening the nuts on the braces for the standards the said braces can be adjusted as desirable. In addition to this, owing to the employment of removable pins and the bolt, the handle and portions of the frame can be readily detached from the axle. The rear main brace for the handle can also be detached. It will be seen, also, that the fenders can be removed whenever desirable.

When desirable to mark for sowing seed or replanting plants, I employ the device shown in Fig. 7. The device aforesaid comprises a combined shovel and marker 27, a shank 28, having a bent portion 29, provided with a bolt-hole, and a brace 30, provided with a bolt-hole at its upper end and pivoted to the shank at 31. When this device is used, the fenders and side pieces of the frame, together with the arched brace, are removed. The bent portion 29 is placed on top the axle and a bolt 10 passed through the two parts. The hinged brace is then swung under the handle and the bolt 26 passed through the same. Marking can then be had in a manner which will be apparent.

Owing to the manner of connection of the parts, should any one become damaged it can be readily removed and replaced by another.

My improved cultivator is adapted for easy manipulation and will cultivate in an improved manner.

Having thus described the invention, what is claimed as new, and desired to be secured by Letters Patent, is—

1. In a garden-cultivator, the combination with an axle and traction-wheels, of a frame connected to the axle, shovels carried by the frame, a handle connected to the axle, fenders on opposite sides of and below the handle, a U-shaped clip connecting the fenders and straddling the handle, and a bolt passing through the handle and the clip.

2. In a garden-cultivator, the combination with an axle, carrying wheels therefor, and detachable side frame-bars, of standards connected to said side bars, shovels carried by said standards, a handle detachably secured to the axle, detachable fenders suspended below and on opposite sides of the handle, and a removable, U-shaped clip straddling the handle and connecting said fenders for adapting the fenders to be removed and a combined shovel and marker substituted therefor, substantially as described.

3. In a garden-cultivator, the combination with an axle and traction-wheels therefor, of side frame-bars detachably secured to the axle, a handle, an arched bar connecting the side bars and handle, standards pivoted to the outer sides of said side bars, angular braces having threaded ends which pass through the standards and are secured thereto, bolts or nuts passing through eyes on the other ends of the braces and the side bars, forward and inner standards on the inner side of said side bars, pivoted on said bolts, and angular braces connecting said inner standards to the side bars, substantially as described.

4. A garden-cultivator comprising an axle, traction-wheels journaled to the axle, side bars detachably connected to the axle, a handle detachably connected to the axle, a curved brace connected to the side bars and the handle, standards having shovels and pivoted to the side bars, braces adjustably connecting said standards to the side bars, fenders located on opposite sides of the handle, and a U-shaped clip connecting the fenders and straddling the handle and detachably connected thereto.

In testimony whereof I have signed this specification in the presence of two subscribing witnesses.

GEORGE W. ROSE.

Witnesses:
F. J. ANDERSON,
ELMER CURLEY.